United States Patent
Yanai et al.

(10) Patent No.: US 11,343,479 B2
(45) Date of Patent: May 24, 2022

(54) CONTROL METHOD FOR POSITION DETECTING DEVICE, POSITION DETECTING DEVICE, AND PROJECTOR

(71) Applicant: SEIKO EPSON CORPORATION, Tokyo (JP)

(72) Inventors: Kohei Yanai, Matsumoto (JP); Akihiko Tamura, Matsumoto (JP); Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/187,291

(22) Filed: Feb. 26, 2021

(65) Prior Publication Data

US 2021/0274138 A1 Sep. 2, 2021

(30) Foreign Application Priority Data

Feb. 28, 2020 (JP) ............................ JP2020-032799

(51) Int. Cl.
*G06F 3/03* (2006.01)
*H04N 9/31* (2006.01)

(52) U.S. Cl.
CPC ......... *H04N 9/3194* (2013.01); *G06F 3/0304* (2013.01)

(58) Field of Classification Search
CPC ... G06F 3/00; G06F 3/005; G06F 3/01; G06F 3/03; G06F 3/0304; G06F 3/0325; G06F 3/033; G06F 3/0412; G06F 3/0414; G06F 3/042–0426; H04N 9/3194
See application file for complete search history.

(56) References Cited

U.S. PATENT DOCUMENTS

| | | | | |
|---|---|---|---|---|
| 2014/0300870 A1* | 10/2014 | Nishioka | ............... | G06F 3/0423 353/31 |
| 2014/0313166 A1* | 10/2014 | Rattray | .................... | F21V 5/04 345/175 |
| 2014/0362052 A1* | 12/2014 | McCaughan | ......... | G06F 3/0421 345/175 |
| 2015/0204659 A1 | 7/2015 | Furukawa | | |
| 2015/0268732 A1* | 9/2015 | Walline | ................. | G06F 3/0426 345/156 |

(Continued)

FOREIGN PATENT DOCUMENTS

JP 2001-290603 A 10/2001
JP 2015-158653 A 9/2015

(Continued)

*Primary Examiner* — John W Miller
*Assistant Examiner* — Humam M Satti
(74) *Attorney, Agent, or Firm* — Oliff PLC

(57) ABSTRACT

A control method for a position detecting device including a first adjusting step of emitting detection light to a jig for adjustment disposed on a screen and adjusting the detection light to first detection light such that the detection light is emitted to a specific range of the jig for adjustment and a step of setting, in a state in which the detection light has been adjusted to the first detection light, a region including the jig for adjustment as a non-detection area where a detecting section does not detect the detection light as the reflected light from an obstacle, wherein the position detecting device including a light emitting section configured to emit the detection light and the detecting section.

7 Claims, 11 Drawing Sheets

(56) References Cited

U.S. PATENT DOCUMENTS

2018/0278900 A1* 9/2018 Wakimoto .............. G06F 3/042
2019/0377435 A1* 12/2019 Piot ....................... G06F 3/0416

FOREIGN PATENT DOCUMENTS

| JP | 2015158653 A | * | 9/2015 | ........... G06F 3/0428 |
| JP | 2015159529 A | * | 9/2015 | ........... G06F 3/0325 |
| JP | 2018-164251 A | | 10/2018 | |
| JP | 2018164251 A | * | 10/2018 | ............... H04N 5/74 |

* cited by examiner

CONTROL METHOD FOR POSITION DETECTING DEVICE, POSITION DETECTING DEVICE, AND PROJECTOR

The present application is based on, and claims priority from JP Application Serial Number 2020-032799, filed Feb. 28, 2020, the disclosure of which is hereby incorporated by reference herein in its entirety.

BACKGROUND

1. Technical Field

The present disclosure relates to a control method for a position detecting device, the position detecting device, and a projector.

2. Related Art

In a light curtain generating device, an emitting direction of a light curtain is adjusted based on a reflection position by a screen (see, for example, JP-A-2018-164251 (Patent Literature 1)). The light curtain indicates planar light in an infrared wavelength band.

In the light curtain generating device described in Patent Literature 1, the emitting direction of the light curtain is adjusted based on the reflection position by the screen. However, in some case, the light curtain is emitted to a jig for adjustment set on a projection surface and the emitting direction of the light curtain is adjusted based on reflected light by the jig for adjustment.

In such a case, the reflected light by the jig for adjustment is sometimes reflected on the projection surface. It is sometimes difficult to execute adjustment of the emitting direction of the light curtain.

SUMMARY

An aspect of the present disclosure is directed to a control method for a position detecting device including: a first adjusting step of emitting detection light to a jig disposed on a display surface and adjust the detection light to first detection light such that the detection light is emitted to a specific range of the jig; and a step of setting, in a state in which the detection light has been adjusted to the first detection light, a region including the jig as a non-detection area where a detecting section does not detect the detection light as reflected light from an obstacle, wherein the position detection device including a light emitting section configured to emit, along the display surface, the detection light for detecting a pointer that points the display surface and the detecting section configured to detect reflected light by the pointer of the detection light.

Another aspect of the present disclosure is directed to a position detecting device including: a light emitting section configured to emit, along a display surface, detection light for detecting a pointer that points the display surface; a detecting section configured to detect reflected light by the pointer of the detection light; and a processor configured to adjust the detection light to first detection light such that the detection light is emitted to a specific range of a jig disposed on the display surface. The processor sets, in a state in which the detection light has been adjusted to the first detection light, a region including the jig as a non-detection area where the detecting section does not detect the detection light as reflected light from an obstacle.

Still another aspect of the present disclosure is directed to a projector including: a light emitting section configured to emit, along a display surface, detection light for detecting a pointer that points the display surface; a detecting section configured to detect reflected light by the pointer of the detection light; a processor configured to adjust the detection light to first detection light such that the detection light is emitted to a specific range of a jig disposed on the display surface; and a lens configured to project image light onto the display surface. The processor sets, in a state in which the detection light has been adjusted to the first detection light, a region including the jig as a non-detection area where the detecting section does not detect the detection light as reflected light from an obstacle.

DESCRIPTION OF EXEMPLARY EMBODIMENTS

An embodiment is explained below with reference to the drawings.

Figure 1:
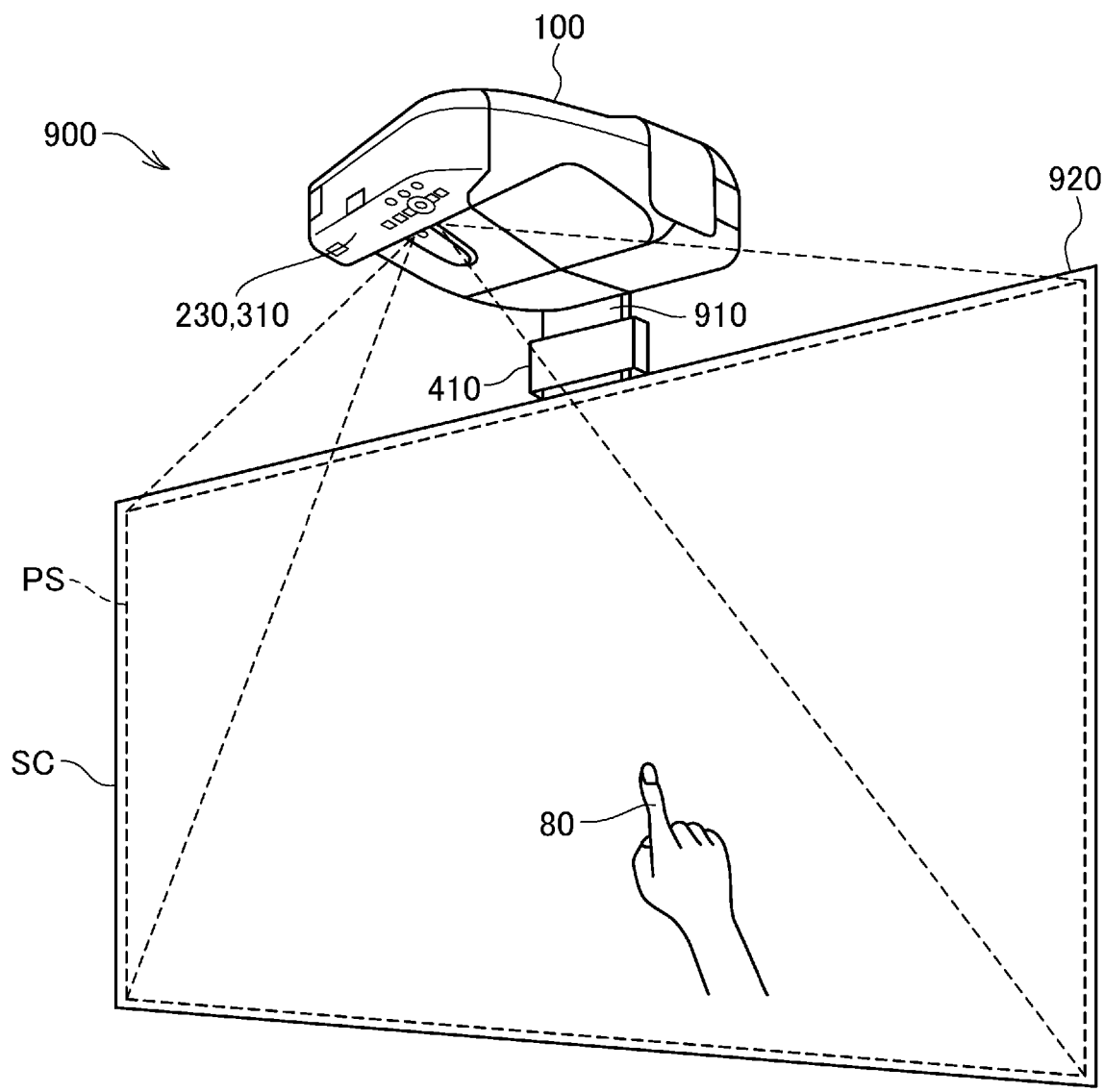
FIG. 1 is a perspective view showing an example of a display system according to an embodiment.
Figure 2:
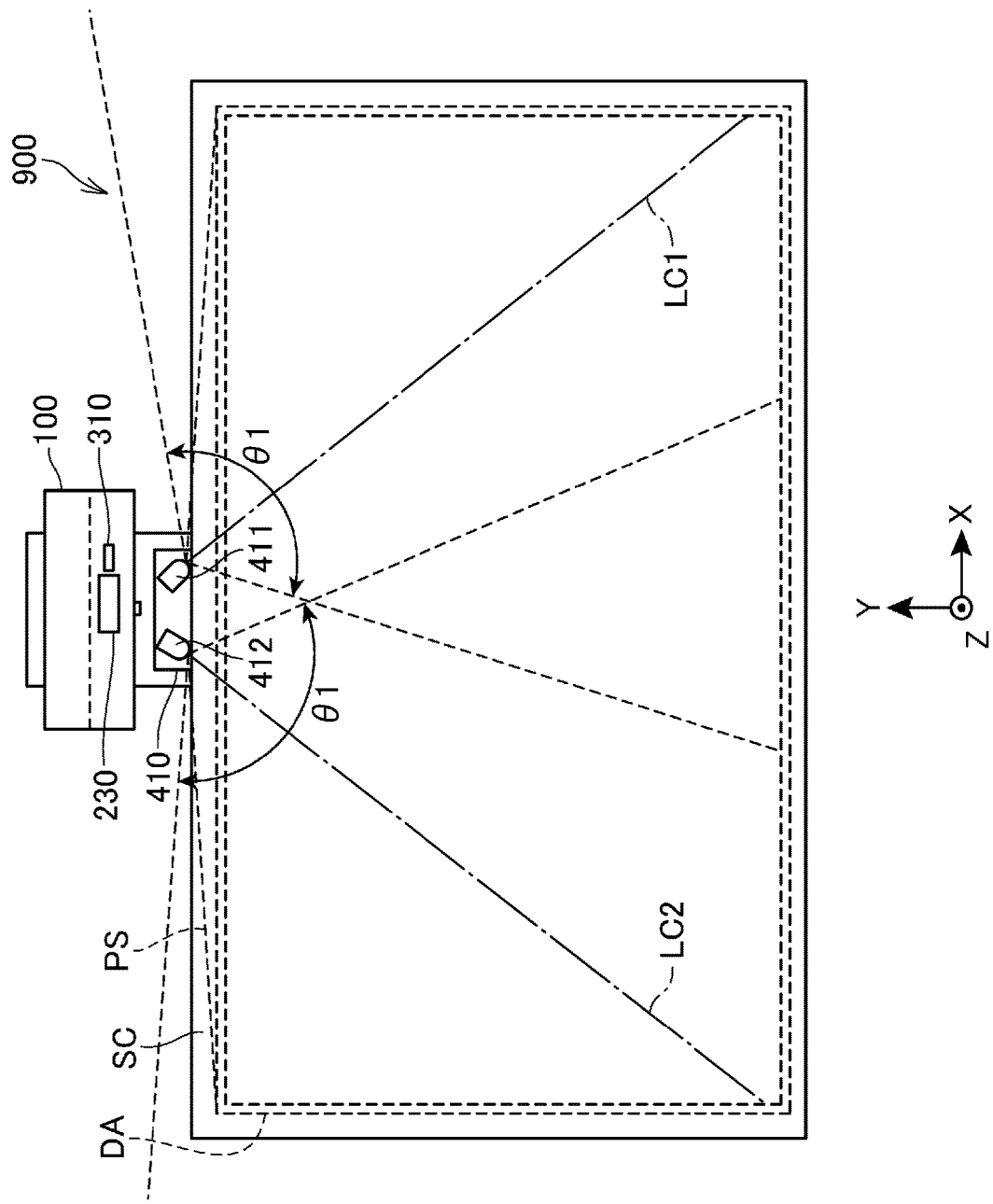
FIG. 2 is a front view showing an example of the configuration of the display system.
Figure 3:
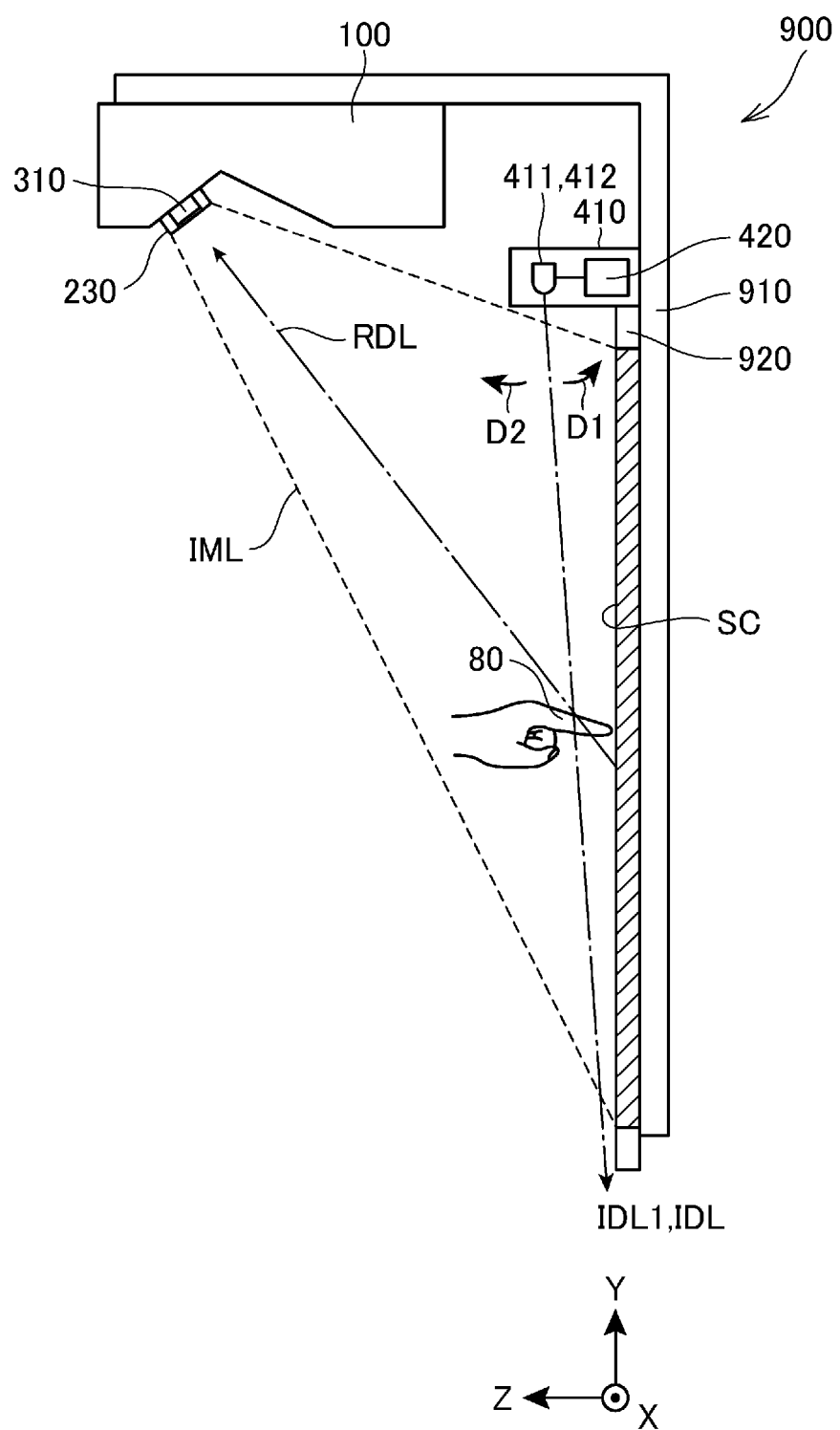
FIG. 3 is a side view showing the example of the configuration of the display system.

The configuration of a display system 900 according to this embodiment is explained with reference to FIGS. 1 to 3. FIG. 1 is a perspective view showing an example of the display system 900 according to this embodiment. FIG. 2 is a front view showing an example of the configuration of the display system 900. FIG. 3 is a side view showing the example of the configuration of the display system 900.

In FIG. 1, an X axis, a Y axis, and a Z axis orthogonal to one another are shown. The Y axis is parallel to the vertical direction. Each of the X axis and the Z axis is parallel to the horizontal direction. The X axis indicates the left-right direction. The Z axis indicates the front-rear direction. A positive direction of the X axis indicates the right direction. A positive direction of the Y axis indicates the upward direction. A positive direction of the Z axis indicates the forward direction. In FIGS. 2 and 3, the left-right direction of a screen SC corresponds to the X-axis direction, the up-down direction of the screen SC corresponds to the Y-axis direction, and the normal direction of the screen SC corresponds to the Z-axis direction.

The display system 900 includes a projector 100. A screen plate 920 is disposed in a position corresponding to the projector 100. The front surface of the screen plate 920 is used as the screen SC. The projector 100 is fixed in the forward direction and the upward direction with respect to the screen plate 920 by a supporting member 910.

In FIG. 1, the screen SC is disposed along the vertical direction. However, the screen SC may be disposed along the horizontal direction. In the embodiment of the present disclosure, as an example, the projector 100 projects image light onto the planar screen SC. However, a projection target is not limited to the screen SC and may be a plane such as a wall surface of a building or may be a curved surface or an uneven surface.

The projector 100 projects image light onto the screen SC to thereby form a projection image PS on the screen SC. The projection image PS indicates an image projected onto the screen SC by the projector 100. In a normal use state of the projector 100, the projection image PS is projected to fit in the inner side of the screen SC.

The screen SC corresponds to an example of the "display surface".

The projection image PS is, for example, an image projected based on image data stored by the projector 100 or generated by the projector 100. When image data is absent in the projector 100, white light is projected from the projector 100 and a white image is displayed as the projection image PS.

In the display system 900, position pointing operation can be performed by a pointer 80. The projector 100 detects a pointed position pointed by the pointer 80. The pointer 80 indicates a pen, a finger of a user, or the like.

The projector 100 includes a projection optical system 230, an imaging section 300 including a camera 310, and a detection-light emitting section 410. The projection optical system 230 projects the projection image PS onto the screen SC. The camera 310 captures the projection image PS and outputs a captured image. An angle of view, that is, an imaging range of the camera 310 is a range including at least the projection image PS on the screen SC. A projection lens of the projection optical system 230 and an imaging lens of the camera 310 are disposed on the lower surface of the projector 100.

The detection-light emitting section 410 emits detection light IDL in order to detect a pointed position of the pointer 80. The detection-light emitting section 410 is fixed to the supporting member 910 or the screen plate 920 and disposed above the screen SC.

The detection-light emitting section 410 emits, in a direction including the screen SC, the detection light IDL for detecting the distal end portion of the pointer 80. Specifically, the detection-light emitting section 410 emits the detection light IDL in a planar shape along the screen SC. As the detection light IDL emitted by the detection-light emitting section 410, for example, near infrared light is used.

The detection-light emitting section 410 corresponds to an example of the "light emitting section".

The detection-light emitting section 410 includes a first emitting section 411, a second emitting section 412, and an adjusting mechanism 420 that adjusts emitting directions of the first emitting section 411 and the second emitting section 412. The first emitting section 411 emits the detection light IDL along the right half surface of the screen SC. The second emitting section 412 emits the detection light IDL along the left half surface of the screen SC. Each of the first emitting section 411 and the second emitting section 412 includes a light source such as an LED (Light Emitting Diode) and an optical element that diffuses, along the screen SC, detection light emitted by the light source and emits the detection light as the detection light IDL.

As shown in FIG. 2, the first emitting section 411 emits the planar detection light IDL in a range of an angle θ1 with an optical axis set as an optical axis LC1. The second emitting section 412 emits the planar detection light IDL in a range of an angle θ2 with an optical axis set as an optical axis LC2. Each of the angle θ1 and the angle θ2 is larger than 90 degrees. In FIG. 2, for convenience, the first emitting section 411 and the second emitting section 412 are shown as being separated. However, the first emitting section 411 and the second emitting section 412 are disposed close to each other.

As a result, the detection-light emitting section 410 emits light downward in a range of approximately 180 degrees from an upper part of the screen SC. The light forms a layer of light along the screen SC.

As shown in FIG. 3, the detection light IDL is adjusted to first detection light IDL1 such that the surface of the screen SC and the layer of light do not to come into contact with each other but come close to each other. For the projector 100 to accurately detect a pointed position pointed by the pointer 80, the distance between the surface of the screen SC, which is an operation surface, and the layer of light of the detection light IDL is preferably as short as possible. However, when the distance is short, misdetection due to unevenness of the surface of the screen SC or an obstacle occurs. For example, the distance between the surface of the screen SC and the layer of light is adjusted to, for example, a range of 1 mm to 10 mm.

These adjustments of the detection light IDL are executed in an adjustment mode of the projector 100 and are explained below.

A region to which the detection-light emitting section 410 emits the detection light IDL is a region corresponding to the projection image PS and is preferably a region including the projection image PS.

In a normal mode for detecting operation by the pointer 80, the projector 100, in which the detection light IDL is adjusted, detects reflected detection light RDL, which is reflected light reflected by the pointer 80 of the detection light IDL emitted by the detection-light emitting section 410, as a bright spot from a captured image of the camera 310.

In this case, the operation of the pointer 80 can be detected in the region to which the detection light IDL is emitted, the region being included in the angle of view of the camera 310. In other words, in the region to which the detection-light emitting section 410 emits the detection light IDL, the region included in the angle of view of the camera 310 is a region where the operation of the pointer 80 can be detected. A detection region DA shown in FIG. 2 is the region where the operation of the pointer 80 can be detected.

The detection region DA includes the projection image PS on the screen SC.

The camera 310 has at least a first imaging function of receiving light in a wavelength region including a wavelength of the detection light IDL emitted by the detection-light emitting section 410 and performing imaging. Preferably, the camera 310 further has a second imaging function of receiving light including visible light and performing imaging, and is configured to be capable of switching these two imaging functions.

For example, the camera 310 is preferably includes a not-shown near infrared filter switching mechanism capable of placing, in front of a lens, a near infrared filter that blocks visible light and allows only near infrared light to pass and retracting the near infrared filter from the front of the lens.

The projector 100 detects pointing operation of the pointer 80, specifies a pointed position, and performs operation corresponding to the pointed position. For example, the projector 100 operates in a whiteboard mode for drawing a line or a figure according to operation of the pointer 80 and projecting the line or the figure as the projection image PS. In the whiteboard mode, the projector 100 may project, as the projection image PS, an image including a menu bar for setting an attribute of a figure to be drawn and the operation of the projector 100.

The projector 100 is capable of operating in other modes than the whiteboard mode. For example, the projector 100 can execute, based on image data input from a not-shown image source such as a personal computer, an operation mode for projecting the projection image PS.

Figure 4:
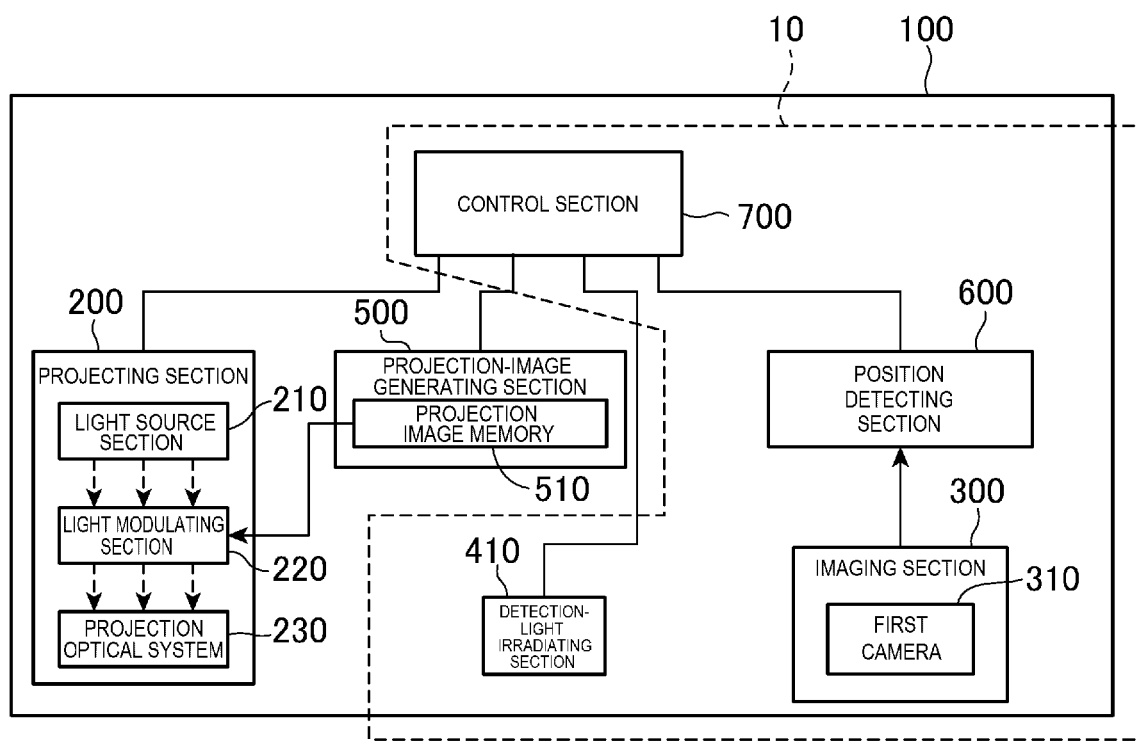
FIG. 4 is a diagram showing an example of the configuration of a projector according to the embodiment.

FIG. 4 is a diagram showing an example of the configuration of the projector 100 according to this embodiment. The projector 100 includes a position detecting device 10, a projecting section 200, and a projection-image generating section 500.

The position detecting device 10 is a device that detects pointing operation of the pointer 80 and includes a control section 700, a position detecting section 600, the imaging section 300, and the detection-light emitting section 410.

The control section 700 performs control of the sections of the projector 100. The control section 700 performs processing associated with a pointing position on the operation surface of the pointer 80 detected by the position detecting section 600. The control section 700 determines content instructed by operation of the pointer 80 and controls, based on the instruction, processing in which the projection-image generating section 500 creates or changes a projection image.

The projection-image generating section 500 includes a projection image memory 510 that stores a projection image. The projection image memory 510 is a so-called frame memory that stores, in a frame unit, an image projected by the projecting section 200.

The projection-image generating section 500 draws, based on image data, in the projection image memory 510, the projection image PS to be projected onto the screen SC. The projection-image generating section 500 outputs an image signal indicating an image in the projection image memory 510 to a light modulating section 220 and causes the projecting section 200 to project the projection image PS. The projection-image generating section 500 executes image processing for the image drawn in the projection image memory 510. The projection-image generating section 500 executes, for example, geometric correction processing for correcting trapezoidal distortion or the like of the projection image PS, digital zoom processing for enlarging or reducing the projection image PS, and color correction processing for correcting a color tone or the like of the projection image PS.

The projecting section 200 projects the image processed by the projection-image generating section 500 onto the screen SC. The projecting section 200 includes a light source section 210, the light modulating section 220, and the projection optical system 230.

The light source section 210 includes a solid-state light source such as an LED or a laser light source and a phosphor light source such as a phosphor element.

The light source section 210 may include a reflector and an auxiliary reflector that guide light emitted by a light source to the light modulating section 220. Further, the light source section 210 may include a lens group and a polarizing plate for improving optical characteristics of projected light or a dimming element that reduces a light amount of the light emitted by the light source on a route leading to the light modulating section 220.

The light modulating section 220 includes, for example, not-shown three liquid crystal panels corresponding to the three primary colors of R, G, and B. R indicates red, G indicates green, and B indicates blue. That is, the light modulating section 220 includes a liquid crystal panel corresponding to R light, a liquid crystal panel corresponding to G light, and a liquid crystal panel corresponding to B light.

Light emitted by the light source section 210 is separated into color lights of three colors of RGB, which are respectively made incident on the liquid crystal panels corresponding to the color lights. Each of the three liquid crystal panels is a liquid crystal panel of a transmission type and modulates transmitted light to generate image light. Image lights transmitted through the liquid crystal panels and modulated are combined by a combination optical system such as a cross dichroic prism and emitted to the projection optical system 230.

In the embodiment of the present disclosure, the light modulating section 220 includes the liquid crystal panels of the transmission type as light modulating elements. However, the embodiment of the present disclosure is not limited to this. The light modulating elements may be liquid crystal panels of a reflection type or may be digital micromirror devices.

The projection optical system 230 includes a lens and a mirror that image incident image light on the screen SC.

The projection optical system 230 may include a zoom mechanism that enlarges or reduces an image to be projected onto the screen SC and a focus adjusting mechanism that performs adjustment of a focus.

The imaging section 300 includes the camera 310. The camera 310 receives light in a wavelength region including a wavelength of the detection light IDL and performs imaging. The camera 310 receives the reflected detection light RDL, which is reflected light reflected on the pointer 80 of the detection light IDL emitted by the detection-light emitting section 410 and performs imaging. Therefore, the reflected detection light RDL can be detected from a captured image of the camera 310.

The reflected detection light RDL corresponds to an example of the "reflected light".

The imaging section 300 corresponds to a part of the "detecting section".

The position detecting section 600 detects the reflected detection light RDL from the captured image of the camera 310. The position detecting section 600 specifies a position of an image of detected light in the captured image and detects the position of the pointer 80.

The position detecting section 600 corresponds to a part of the "detecting section". That is, the imaging section 300 and the position detecting section 600 configure an example of the "detecting section".

Note that the camera 310 preferably has a function of performing imaging using light including visible light in addition to a function of performing imaging using light including near infrared light. In this case, the camera 310 captures the projection image PS projected onto the screen SC. The projection-image generating section 500 is capable of executing trapezoidal distortion correction using an image captured by the camera 310.

Figure 5:
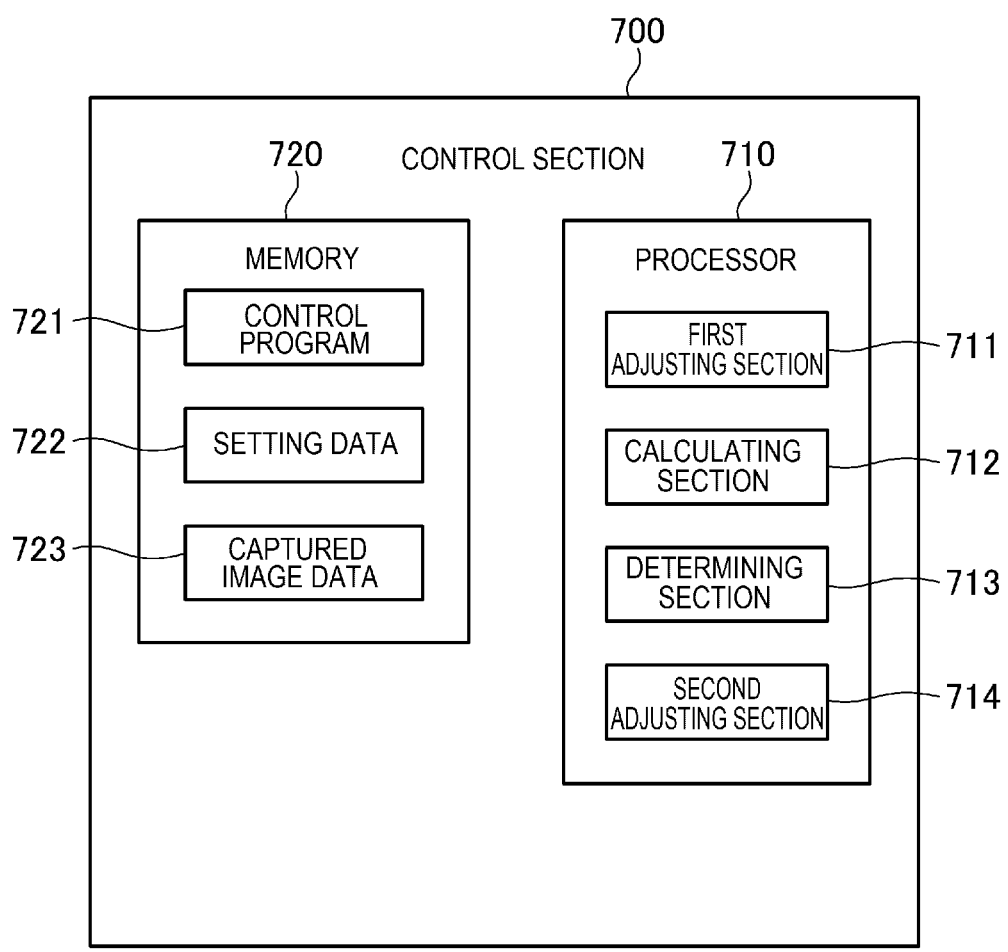
FIG. 5 is a diagram showing an example of the configuration of a control section according to the embodiment.

FIG. 5 is a diagram showing an example of the configuration of the control section 700 according to this embodiment in the adjustment mode of the projector 100. The control section 700 includes a memory 720 and a processor 710.

The memory 720 is a storage device that stores, in a nonvolatile manner, programs to be executed by the processor 710 and data. The memory 720 is configured by a magnetic storage device, a semiconductor storage element such as a flash ROM (Read Only Memory), or a nonvolatile storage device of another type. The memory 720 may include a RAM (Random Access Memory) configuring a work area of the processor 710. The memory 720 stores data to be processed by the control section 700 and a control program to be executed by the processor 710.

The processor 710 may be configured by a single processor or a plurality of processors may function as the processor 710. The processor 710 executes the control program to control the sections of the projector 100. For example, the processor 710 outputs, to a not-shown image processing section, an execution instruction for image processing corresponding to operation received by a not-shown operation section or a not-shown remote controller and parameters used for the image processing. The parameters include, for example, a geometric correction parameter for correcting geometric distortion of an image to be projected onto the screen SC.

As shown in FIG. 5, the memory 720 of the control section 700 stores a control program 721, setting data 722, and captured image data 723.

The control program 721 is executed by the processor 710.

The setting data 722 includes setting values concerning the operation of the projector 100. The setting values included in the setting data 722 are, for example, setting concerning image processing to be executed by the projection-image generating section 500 and parameters used for the image processing by the projection-image generating section 500.

The captured image data 723 is captured image data output by the imaging section 300. The imaging section 300 outputs the captured image data to the control section 700 every time imaging is performed by the camera 310.

The control section 700 temporarily stores the captured image data in the memory 720 in order to perform processing for analyzing the captured image data.

The processor 710 of the control section 700 includes a first adjusting section 711, a calculating section 712, a determining section 713, and a second adjusting section 714. The processor 710 of the control section 700 executes the control program 721 stored in the memory 720 to thereby function as the first adjusting section 711, the calculating section 712, the determining section 713, and the second adjusting section 714.

The first adjusting section 711 executes "first adjustment processing". The first adjustment processing is processing for emitting the detection light IDL to the jig for adjustment 70 disposed on the screen SC and adjusting an angle formed by the detection light IDL and the screen SC such that the detection light IDL is emitted to a specific range of the jig for adjustment 70.

First angle adjustment processing and the jig for adjustment 70 are explained below with reference to FIG. 6.

The second adjusting section 714 executes "second angle adjustment processing".

The second angle adjustment processing is processing for, when an obstacle likely to cause misdetection in the normal mode is present in the detection region DA, to prevent the reflected detection light RDL from the obstacle from being detected, adjusting an emitting direction of the detection light IDL to the normal direction of the screen SC such that the detection light IDL separates from the screen SC.

The second angle adjustment processing is explained with reference to FIGS. 9 and 10 below.

Detection of an obstacle is performed by, in a state in which the detection light LDL is adjusted to the first detection light IDL1 by the first adjustment processing to be emitted to the specific range of the jig for adjustment 70, imaging, with the camera 310, a region of the screen SC to which the first detection light IDL1 is emitted. If the size of a region of a bright spot is equal to or larger than a predetermined size in a captured image by the camera 310, the bright spot is detected as an obstacle. In the detection of an obstacle, in second adjustment processing, a non-detection area AR is set such that the position detecting section 600 does not detect the jig for adjustment 70 as an obstacle. The non-detection area AR is a region where, even when the position detecting section 600 detects the reflected detection light RDL, the position detecting section 600 does not detect the jig for adjustment 70 as an obstacle. The non-detection area AR is explained below with reference to FIGS. 7 to 9.

The calculating section 712 calculates a reflection position on the screen SC of the reflected detection light RDL of the first detection light IDL1, which is emitted from the detection-light emitting section 410, sequentially reflected by the jig for adjustment 70 and the screen SC, and detected by the position detecting section 600. For example, according to a shape and a setting state of the jig for adjustment 70 and a surface state of the screen SC, the first detection light IDL1 emitted from the detection-light emitting section 410 is reflected on a side surface or the like of the jig for adjustment 70 and reflected light is further reflected on the surface of the screen SC and detected as the reflected detection light RDL. The calculating section 712 calculates, for example, the reflection position on the screen SC as a mirror image position Q1S corresponding to a reflection position of the detection light IDL in the jig for adjustment 70. The mirror image position Q1S and processing of the calculating section 712 are explained below with reference to FIGS. 8 and 9.

The reflection position on the side surface or the like of the jig for adjustment 70 of the first detection light IDL1 corresponds to the "first reflection position" according to the present disclosure. The reflection position on the surface of the screen SC of the light reflected in the first reflection position corresponds to the "second reflection position" according to the present disclosure.

The determining section 713 determines whether the reflection position on the screen SC is included in the set non-detection area AR. When the determining section 713 determines that the reflection position on the screen SC is not included in the non-detection area AR, the non-detection area AR is adjusted to include the reflection position.

Figure 6:
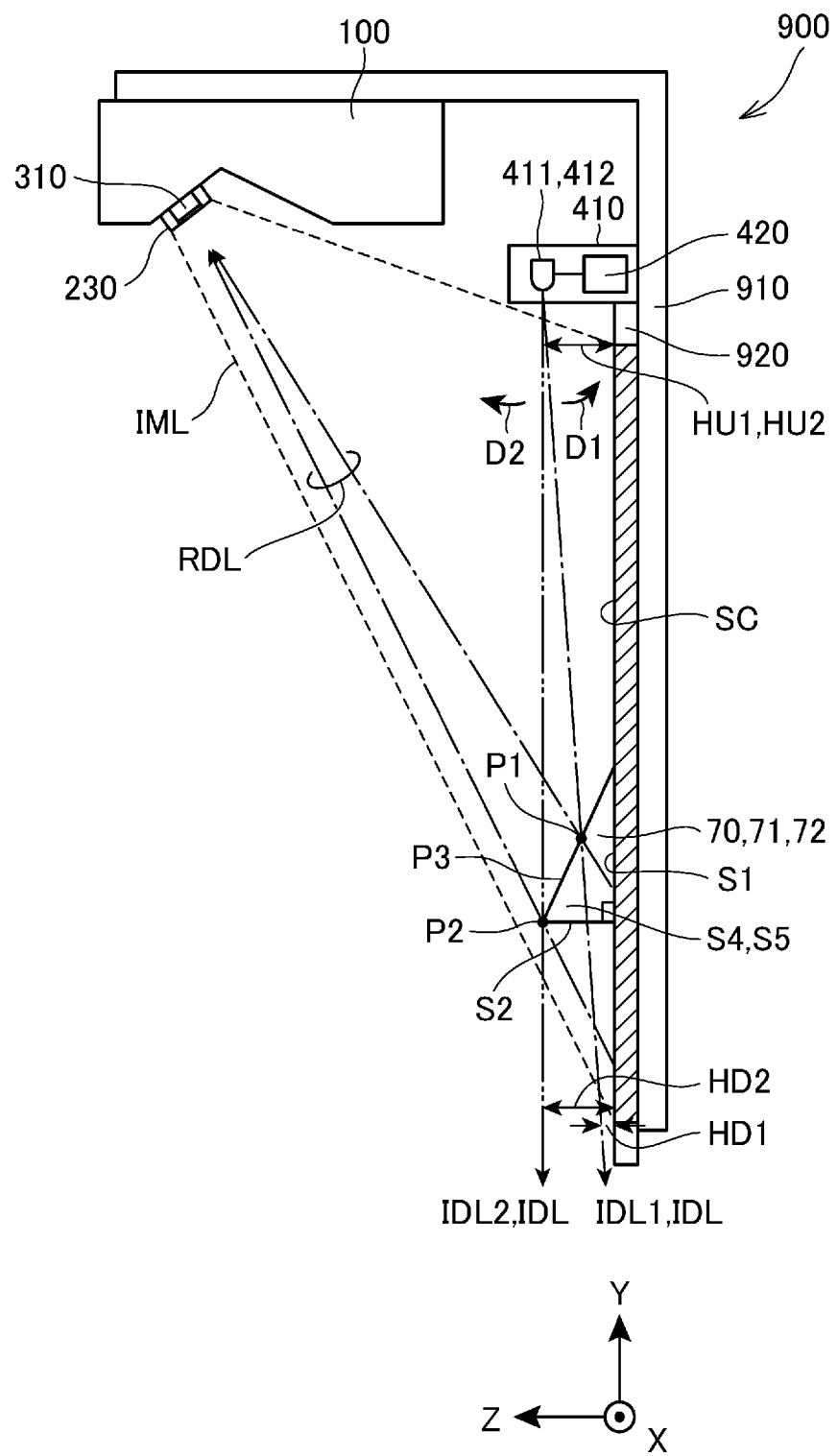
FIG. 6 is a side view of a display system showing an example of first adjustment processing.

FIG. 6 is a side view of the display system 900 showing an example of the first adjustment processing.

Figure 7:
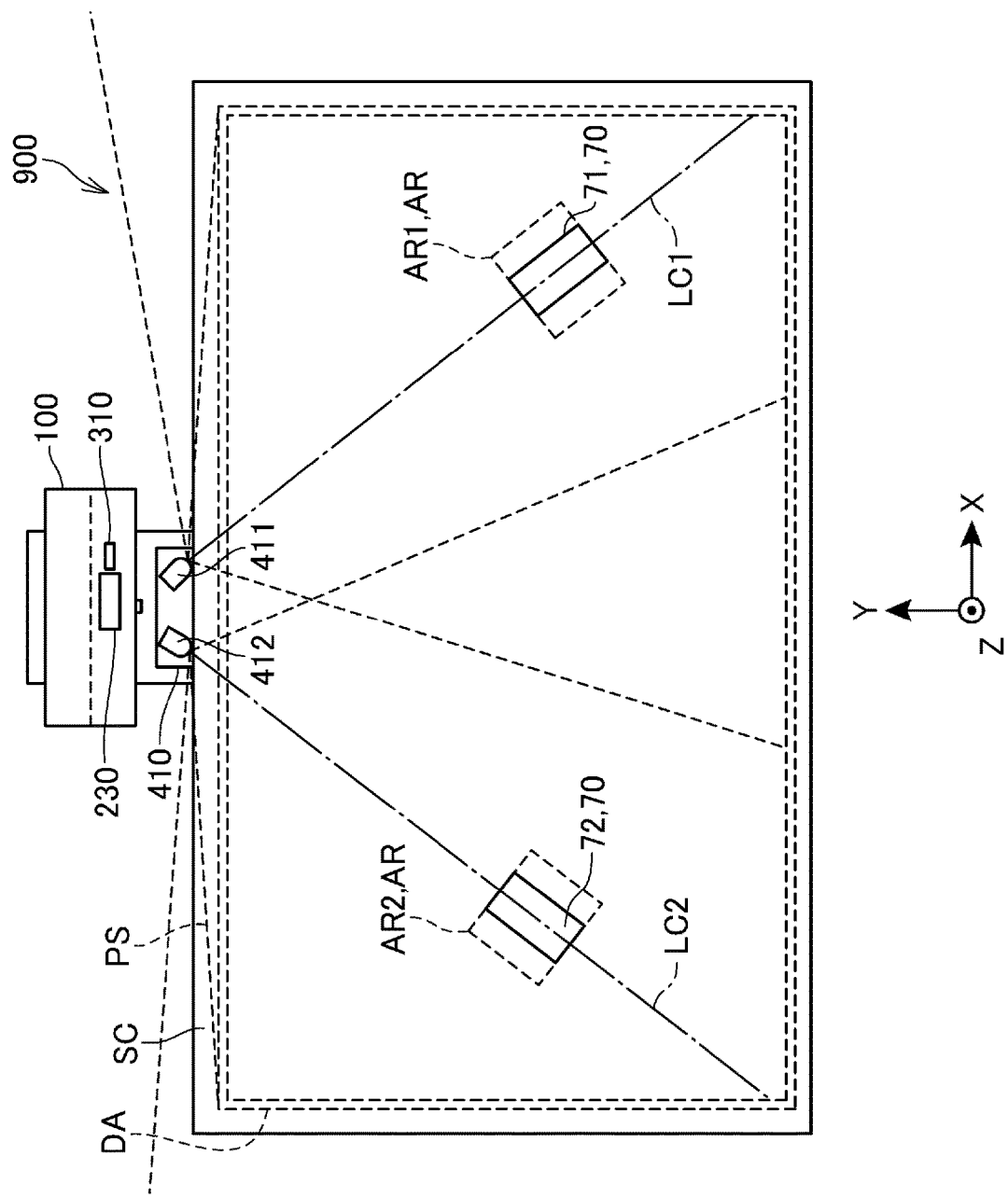
FIG. 7 is a front view of the display system showing the example of the first adjustment processing.

As shown in FIGS. 6 and 7, a first jig for adjustment 71 and a second jig for adjustment 72 are disposed on the screen SC. The first jig for adjustment 71 and the second jig for adjustment 72 are used to adjust a projecting direction of the detection light IDL by each of the first emitting section 411 and the second emitting section 412.

The first jig for adjustment 71 is disposed on, for example, the optical axis LC1 of the first emitting section 411. Specifically, as shown in FIG. 7, the major axis of the first jig for adjustment 71 is disposed on the optical axis LC1 of the first emitting section 411. The second jig for adjustment 72 is disposed on, for example, the optical axis LC2 of the second emitting section 412. Specifically, as shown in FIG. 7, the major axis of the second jig for adjustment 72 is disposed on the optical axis LC2 of the first emitting section 411.

The first jig for adjustment 71 and the second jig for adjustment 72 have substantially the same configuration. Therefore, when the first jig for adjustment 71 and the second jig for adjustment 72 are not distinguished, each of the first jig for adjustment 71 and the second jig for adjustment 72 is sometimes described as jig for adjustment 70.

The first jig for adjustment 71 and the second jig for adjustment 72 correspond to an example of the "jig".

As shown in FIG. 6, the jig for adjustment 70 is capable of reflecting the detection light IDL and is configured to diffuse reflected light to a degree for easily detecting a reflection position in the captured image by the camera 310. The surface of the jig for adjustment 70 includes a first surface S1, a second surface S2, a third surface S3, a fourth surface S4, and a fifth surface S5. The first surface S1 and the second surface S2 are orthogonal. The first surface S1 is a bottom surface of the jig for adjustment 70 fixed to the screen SC. The second surface S2 is a surface facing the opposite side of the detection-light emitting section 410. The third surface S3 forms the upper surface of the jig for adjustment 70 tilted with respect to the bottom surface of the jig for adjustment 70 such that the detection light IDL can be reflected and a reflection position can be imaged by the camera 310. The third surface S3 is tilted to further separate from the screen SC as the third surface S3 further separates to the opposite side of the detection-light emitting section 410. Specular reflection light of the detection light IDL does not reach the camera 310. A first position P1 and a second position P2 set as targets of adjustment of the detection light IDL are specified on the third surface S3. The forth surface S4 and the fifth surface S5 are defined by the first surface S1, the second surface S2, and the third surface S3 and form side surfaces with respect to the detection light IDL.

Each of the first emitting section 411 and the second emitting section 412 is configured to be capable of adjusting an emitting direction of the detection light IDL. Specifically, each of the first emitting section 411 and the second emitting section 412 is configured to be capable of adjusting the emitting direction of the detection light IDL, for example, in a range from the first detection light IDL1 to second detection light IDL2. Each of the first emitting section 411 and the second emitting section 412 is configured to be capable of turning in a direction D1 and a direction D2.

The direction D1 indicates a direction in which each of the first emitting section 411 and the second emitting section 412 is turned to bring the emitting direction of the detection light IDL close to the screen SC, that is, in FIG. 6, a counterclockwise direction. The direction D2 indicates a direction in which each of the first emitting section 411 and the second emitting section 412 is turned to separate the emitting direction of the detection light IDL from the screen SC, that is, in FIG. 6, a clockwise direction.

In this embodiment, the first adjustment processing is carried out using the jig for adjustment 70. In the first adjustment processing, the emitting direction of the detection light IDL is adjusted such that the detection light IDL of each of the first emitting section 411 and the second emitting section 412 is located in a range from the first detection light IDL1 to the second detection light IDL2.

The first detection light IDL1 corresponds to the detection light IDL emitted to the first position P1. The second detection light IDL2 corresponds to the detection light IDL emitted to the second position P2. The jig for adjustment is disposed with respect to the screen SC and the detection-light emitting section 410 such that the first detection light IDL1 and the first position P1 and the second detection light IDL2 and the second position P2 are in relations shown in FIG. 6.

A range from the first position P1 to the second position P2 corresponds to the "specific range".

The distance between the first detection light IDL1 and the screen SC at the upper end of the screen SC is a distance HU1. The distance between the first detection light IDL1 and the screen SC at the lower end of the screen SC is a distance HD1. The distance between the second detection light IDL2 and the screen SC at the upper end of the screen SC is a distance HU2. The distance between the second detection light IDL2 and the screen SC at the lower end of the screen SC is a distance HD2. The distance HD1 is, for example, 1 mm. The distance HU1, the distance HU2, and the distance HD2 are for example, 10 mm.

In the first adjustment processing, the projecting direction of the detection light IDL is adjusted such that the detection light IDL is located in a range from the first detection light IDL1 to the second detection light IDL2. Therefore, the distance between the surface of the screen SC and the detection light IDL is adjusted to, for example, a range of 1 mm to 10 mm.

In this embodiment, in the first adjustment processing, the emitting direction of the detection light IDL is adjusted such that the detection light IDL coincides with the first detection light IDL1. In this adjustment state, it is confirmed whether misdetection due to an obstacle occurs in the region of the screen SC to which the detection light IDL is emitted. When misdetection due to an obstacle does not occur, the detection light IDL is set to the first detection light IDL1 and the adjustment mode ends. When misdetection due to an obstacle occurs, the second adjustment processing is executed.

As shown in FIG. 7, after the first adjustment processing, a first non-detection area AR1 is set to include the first jig for adjustment 71 and a second non-detection area AR2 is set to include the second jig for adjustment 72.

Specifically, for example, each of the first non-detection area AR1 and the second non-detection area AR2 is set as explained below.

A size in the optical axis LC1 direction of the first non-detection area AR1 coincides with a size in the optical axis LC1 direction of the first jig for adjustment 71. A size in a direction orthogonal to the optical axis LC1 of the first non-detection area AR1 is larger than a size in the direction orthogonal to the optical axis LC1 of the first jig for adjustment 71. The size in the direction orthogonal to the optical axis LC1 of the first non-detection area AR1 is set to, for example, a double of the size in the direction orthogonal to the optical axis LC1 of the first jig for adjustment 71.

A size in the optical axis LC2 direction of the second non-detection area AR2 coincides with a size in the optical axis LC2 direction of the second jig for adjustment 72. A size in a direction orthogonal to the optical axis LC2 of the second non-detection area AR2 is larger than a size in the direction orthogonal to the optical axis LC2 of the second jig for adjustment 72. The size in the direction orthogonal to the optical axis LC2 of the second non-detection area AR2 is set to, for example, a double of the size in the direction orthogonal to the optical axis LC2 of the second jig for adjustment 72.

Figure 8:
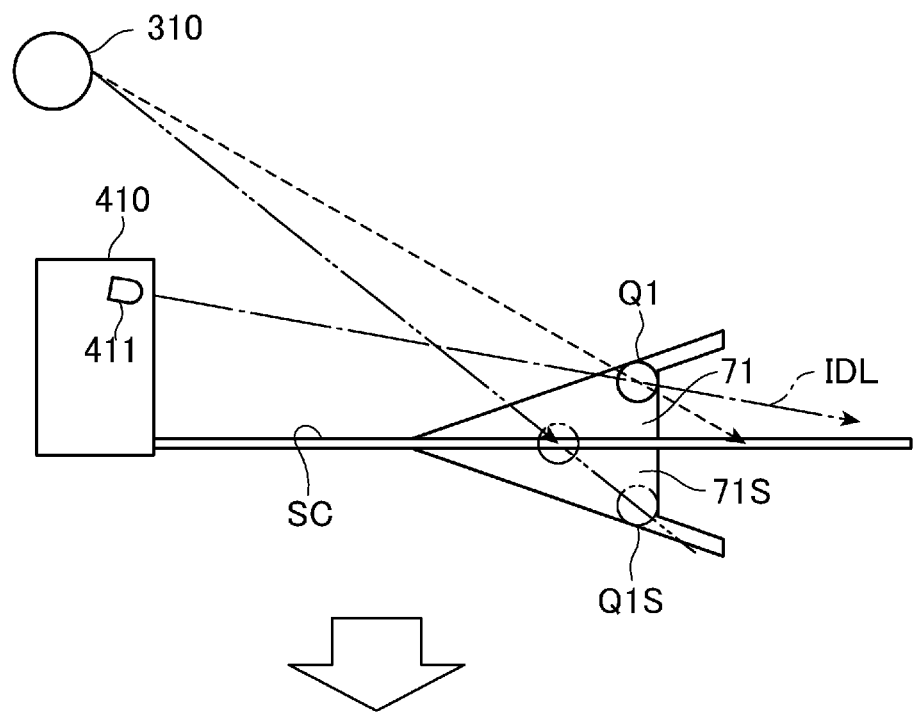
FIG. 8 is a diagram showing an example of calculation of a reflection position.
Figure 8:
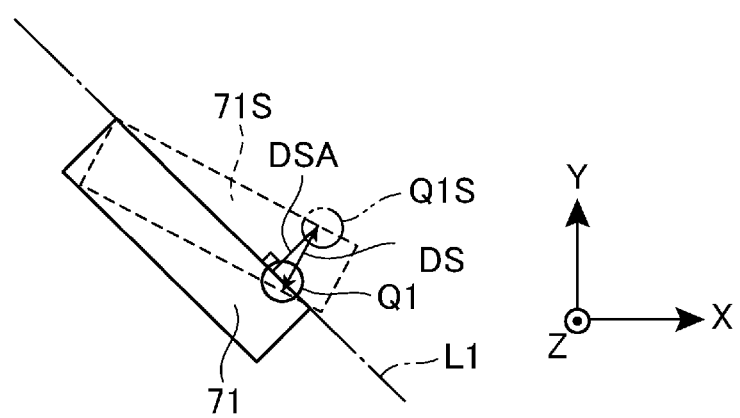

FIG. 8 is a diagram showing an example of a calculation method for a reflection position by the calculating section 712. An upper figure of FIG. 8 shows an example of a side view of the display system 900.

In FIG. 8, reflected light in a position Q1 on the side surface of the first jig for adjustment 71 of the detection light IDL from the first emitting section 411 is reflected on the surface of the screen SC. The reflected light is detected by the camera 310.

In the upper figure of FIG. 8, a mirror image 71S indicates a mirror image of the first jig for adjustment 71. A mirror image position Q1S indicates a position corresponding to the position Q1 in the mirror image 71S.

A lower figure of FIG. 8 shows a schematic diagram of the front of the first jig for adjustment 71 and the screen SC.

In the lower figure of FIG. 8, a straight line L1 indicates a straight line passing the position Q1 and parallel to the side surface of the first jig for adjustment 71 that reflects the detection light IDL from the first emitting section 411.

A distance DS indicates the distance between the position Q1 and the mirror image position Q1S. A distance DSA indicates the distance between the mirror image position Q1S and the straight line L1.

When the straight line L1 is represented by the following Expression (1) and a coordinate of the mirror image position Q1S is represented as (XS, YS), the distance DSA is represented by the following Expression (2).

$$a \times X + b \times Y + c = 0 \quad (1)$$

where, a constant "a", a constant "b", and a constant "c" are defined by a coordinate of the position Q1 and a tilt of the side surface of the first jig for adjustment 71.

$$DSA = |a \times XS + b \times YS + c|/(a^2 + b^2)^{1/2} \quad (2)$$

That is, the calculating section 712 calculates the distance DSA according to Expression (2).

As explained with reference to FIG. 8, the calculating section 712 can easily calculate the distance DSA according to Expression (2). Since the calculating section 712 calculates the distance DSA, the determining section 713 can easily determine whether the mirror image position Q1S is included in the non-detection area AR.

When the determining section 713 determines that the mirror image position Q1S is not included in the non-detection area AR, the non-detection area AR1 is adjusted such that the non-detection area AR includes the mirror image position Q1S. For example, the non-detection area AR1 is expanded to a non-detection area AR11. The non-detection area AR11 includes the mirror image position Q1S.

On the other hand, when the determining section 713 determines that the mirror image position Q1S is included in the non-detection area AR, the non-detection area AR is not adjusted. That is, a range of the non-detection area AR is not enlarged.

Figure 10:
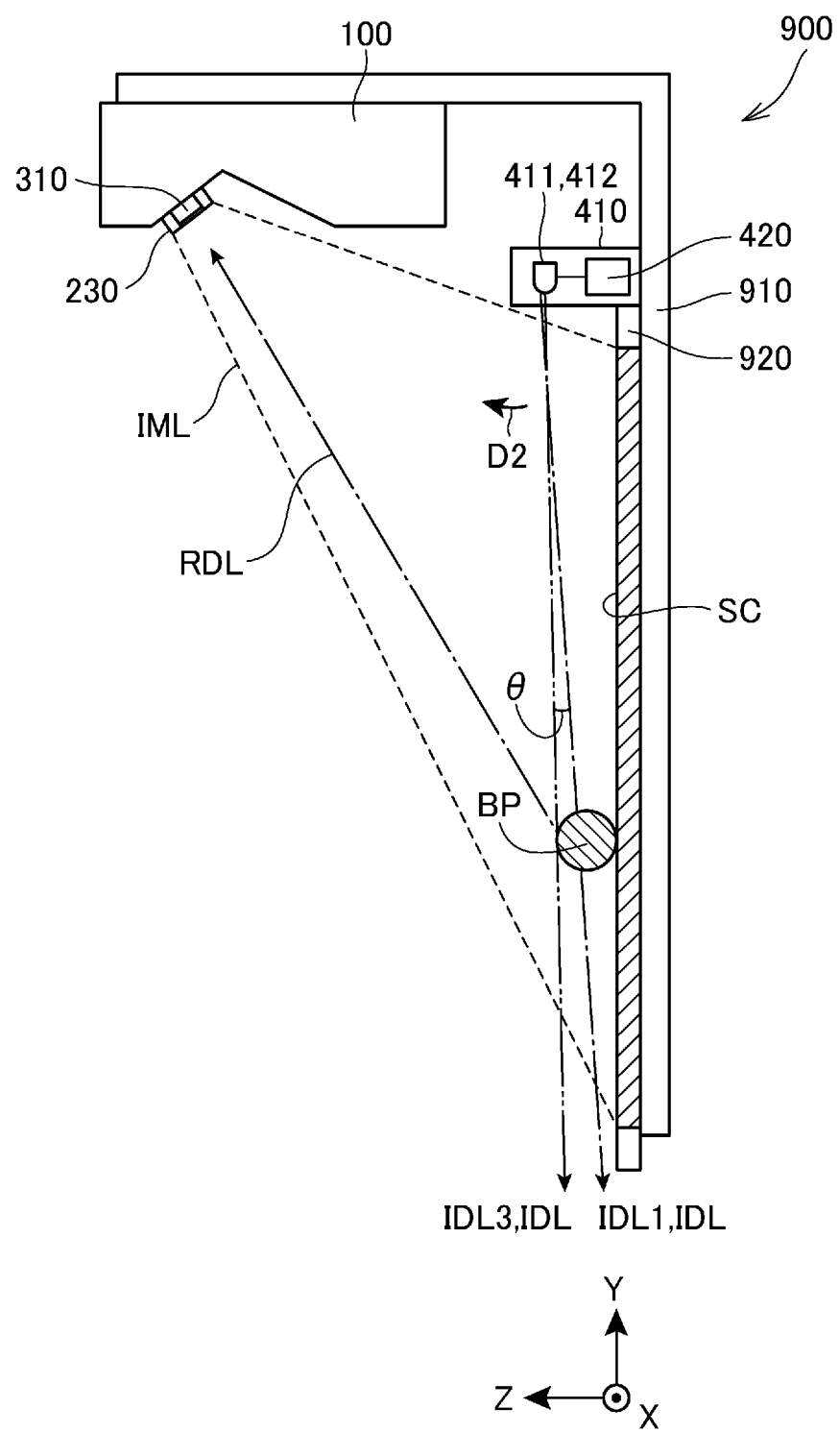
FIG. 10 is a side view of the display system showing an example of second angle adjustment processing.

FIG. 10 is a side view of the display system 900 showing an example of the second adjustment processing.

Figure 9:
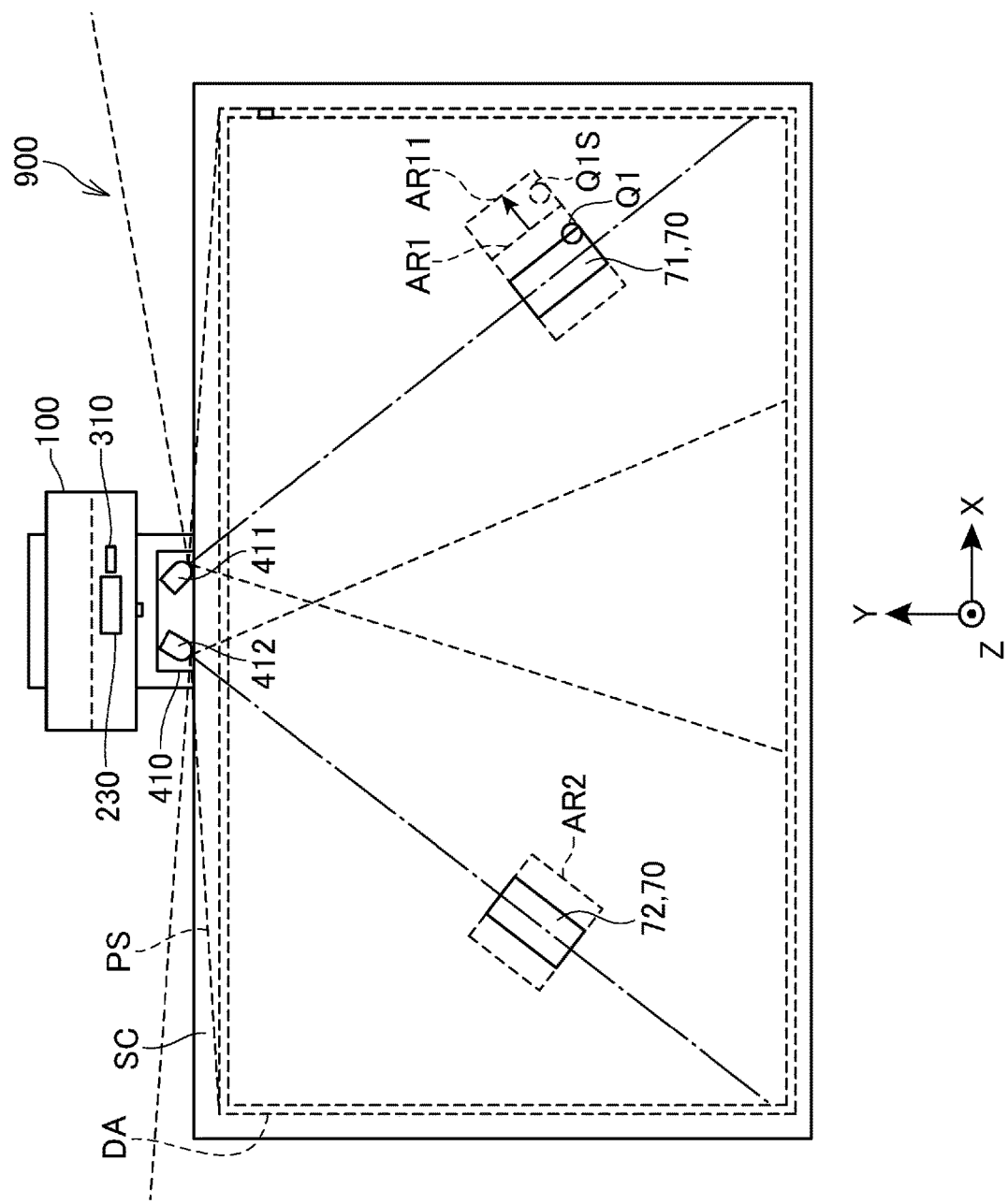
FIG. 9 is a front view of the display system showing an example of adjustment of a non-detection area.

In FIG. 10, in a front view of FIG. 9, an obstacle BP is disposed on the surface of the screen SC in a region other than the non-detection area AR.

In this case, to prevent the position detecting section 600 from detecting the reflected detection light RDL reflected from the obstacle BP, the second adjusting section 714 adjusts the emitting direction of the detection light IDL to the normal direction of the screen SC such that the detection light IDL separates from the screen SC.

Specifically, the second adjusting section 714 turns, with the adjusting mechanism 420, the projecting direction of the detection light IDL from each of the first emitting section 411 and the second emitting section 412 by an angle θ in the direction D2 from the first detection light IDL1 to third detection light IDL3 such that the detection light IDL is not projected onto the obstacle BP.

The third detection light IDL3 is located in a range from the first detection light IDL1 to the second detection light IDL2 shown in FIG. 6.

In this way, the second adjusting section 714 adjusts the projecting direction of the detection light IDL such that the detection light IDL is not projected onto the obstacle BP. Therefore, the position detecting section 600 can detect the position of the pointer 80 without detecting the position of the obstacle BP.

Figure 11:
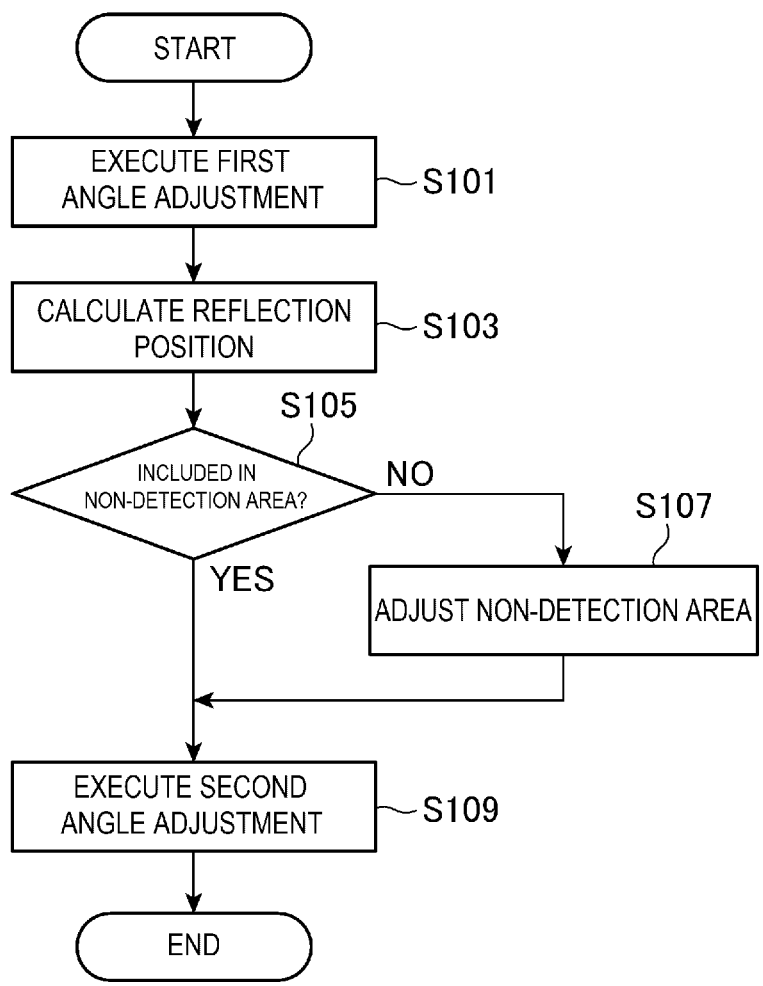
FIG. 11 is a flowchart showing an example of processing of the control section.

FIG. 11 is a flowchart showing an example of processing of the control section 700 in the adjustment mode.

First, as shown in FIG. 11, in step S101, the first adjusting section 711 executes the first angle adjustment processing.

Subsequently, in step S103, the calculating section 712 calculates a reflection position on the screen SC of the reflected detection light RDL. In other words, the calculating section 712 calculates the mirror image position Q1S shown in FIGS. 8 and 9.

Subsequently, in step S105, the determining section 713 determines whether the reflection position is included in the non-detection area AR.

When the determining section 713 determines that the reflection position is included in the non-detection area AR (YES in step S105), the processing proceeds to step S109. When the determining section 713 determines that the reflection position is not included in the non-detection area AR (NO in step S105), the processing proceeds to step S107.

In step S107, the second adjusting section 714 adjusts the non-detection area AR such that the non-detection area AR includes the reflection position.

Subsequently, in step S109, the second adjusting section 714 executes the second angle adjustment processing. Thereafter, the processing ends.

Step S101 corresponds to an example of the "first adjusting step". Step S103 corresponds to an example of the "calculating step". Step S105 corresponds to an example of the "determining step". Step S109 corresponds to an example of the "second adjusting step".

As explained above with reference to FIGS. 1 to 11, a control method for the position detecting device 10 is a control method for the position detecting device 10 including the detection-light emitting section 410 configured to emit, along the screen SC, detection light IDL for detecting the pointer 80 that points the screen SC and the imaging section 300 configured to detect the reflected detection light RDL by the pointer 80 of the detection light IDL, the control method including: a first adjusting step of emitting the detection light IDL to the jig for adjustment 70 disposed on the screen SC and adjusting the detection light IDL to the first detection light IDL1 such that the detection light IDL is emitted to a specific range of the jig for adjustment 70; and a step of setting, in a state in which the detection light IDL is adjusted to the first detection light IDL1, a region including the jig for adjustment 70 as the non-detection area AR where the position detecting section 600 does not detect the detection light IDL as the reflected detection light RDL from the obstacle BP.

Accordingly, even when the imaging section 300 detects the reflected detection light RDL, since the non-detection area AR that the position detecting section 600 does not detect as the obstacle BP is set, by properly setting the non-detection area AR, it is possible to suppress the influence on the adjustment of the emitting direction of the detection light IDL by the reflected detection light RDL of the jig for adjustment 70. Therefore, it is possible to properly adjust the emitting direction of the detection light IDL.

The control method for the position detecting device 10 according to this embodiment further includes: a calculating step of calculating a second reflection position of the reflected detection light RDL sequentially reflected in a first reflection position of the jig for adjustment 70 and the second reflection position of the screen SC and detected by the position detecting section 600; and a determining step of determining whether the second reflection position is included in the non-detection area AR and, when determining that the second reflection position is not included in the non-detection area AR, adjusting the non-detection area AR such that the second reflection position is included in the non-detection area AR.

Therefore, the non-detection area AR is adjusted when it is determined that the second reflection position on the screen SC of the reflected detection light RDL is not included in the non-detection area AR. Consequently, it is possible to properly adjust the non-detection area AR.

The control method for the position detecting device 10 according to this embodiment further includes a second adjusting step of, in a state in which the non-detection area AR is set, when the imaging section 300 detects the reflected detection light RDL from the obstacle BP, adjusting the detection light IDL adjusted to the first detection light IDL1 to separate from the screen SC in the normal direction of the screen SC such that the position detecting section 600 does not detect the reflected detection light RDL from the obstacle BP.

Therefore, the detection light IDL adjusted to the first detection light IDL1 is adjusted to separate from the screen SC in the normal direction of the screen SC such that the position detecting section 600 does not detect the reflected detection light RDL from the obstacle BP. Consequently, it is possible to properly adjust the detection light IDL.

In the control method for the position detecting device 10 according to this embodiment, the first adjusting step includes a step of adjusting an angle formed by the detection light IDL and the screen SC.

Therefore, it is possible to properly adjust the detection light IDL to the first detection light IDL1.

In the control method for the position detecting device 10 according to this embodiment, in the calculating step, the second reflection position on the screen SC of the reflected detection light RDL is calculated as the mirror image position Q1S corresponding to the first reflection position of the detection light IDL in the jig for adjustment 70.

Therefore, the second reflection position on the screen SC of the reflected detection light RDL is calculated as the mirror image position Q1S corresponding to the first reflection position of the detection light IDL in the jig for adjustment 70. Consequently, it is possible to easily calculate a reflection position on the screen SC of the reflected detection light RDL.

The position detecting device 10 according to this embodiment includes: the detection-light emitting section 410 configured to emit, along the screen SC, the detection light IDL for detecting the pointer 80 that points the screen SC; the imaging section 300 configured to detect the reflected detection light RDL by the pointer 80 of the detection light IDL; and the control section 700 configured to adjust the detection light IDL to first detection light IDL1 such that the detection light IDL is emitted to a specific range of the jig for adjustment 70. The control section 700 sets, in a state in which the detection light IDL is adjusted to the first detection light IDL1, a region including the jig for adjustment 70 as the non-detection area AR where the position detecting section 600 does not detect the detection light IDL as the reflected detection light RDL from the obstacle BP.

Accordingly, even when the imaging section 300 detects the reflected detection light RDL, since the non-detection area AR that the position detecting section 600 does not detect as the obstacle BP is set, by properly setting the non-detection area AR, it is possible to suppress the influence on the adjustment of the emitting direction of the detection light IDL by the reflected detection light RDL of the jig for adjustment 70. Therefore, it is possible to properly adjust the emitting direction of the detection light IDL.

The projector 100 according to this embodiment includes: the detection-light emitting section 410 configured to emit, along the screen SC, the detection light IDL for detecting the pointer 80 that points the screen SC; the imaging section 300 configured to detect the reflected detection light RDL by the pointer 80 of the detection light IDL; the control section 700 configured to adjust the detection light IDL to the first detection light IDL1 such that the detection light IDL is emitted to a specific range of the jig for adjustment 70; and the projection optical system 230 configured to project image light onto the screen SC. The control section 700 sets, in a state in which the detection light IDL is adjusted to the first detection light IDL1, a region including the jig for adjustment 70 as the non-detection area AR where the position detecting section 600 does not detect the detection light IDL as the reflected detection light RDL from the obstacle BP.

Accordingly, even when the imaging section 300 detects the reflected detection light RDL, since the non-detection area AR that the position detecting section 600 does not detect as the obstacle BP is set, by properly setting the non-detection area AR, it is possible to suppress the influence on the adjustment of the emitting direction of the detection light IDL by the reflected detection light RDL of the jig for adjustment 70. Therefore, it is possible to properly adjust the emitting direction of the detection light IDL.

The embodiment explained above is a preferred mode of implementation. However, the present disclosure is not limited to the embodiment. Various modified implementations are possible within a range not departing from the gist of the present disclosure.

In this embodiment, each of the first emitting section 411 and the second emitting section 412 is configured to be capable of adjusting a projecting direction of the detection light IDL. However, the embodiment of the present disclosure is not limited to this. The position of each of the first emitting section 411 and the second emitting section 412 may be movable in the normal direction of the screen SC. In this case, in the second adjusting step, the position of each of the first emitting section 411 and the second emitting section 412 may be moved in a direction separating from the screen SC such that the detection light IDL separates from the screen SC.

In this embodiment, the detection-light emitting section 410 includes the first emitting section 411 and the second emitting section 412. However, the embodiment of the present disclosure is not limited to this. The detection-light emitting section 410 only has to include at least one emitting section. In other words, the detection-light emitting section 410 may be configured by, for example, one emitting section or may include, for example, three or more emitting sections.

In this embodiment, the jig for adjustment 70 is formed in the shape shown in FIG. 6. However, the embodiment of the present disclosure is not limited to this. The jig for adjustment 70 only has to be disposed on the screen SC and formed in a shape for the reflected detection light RDL in the jig for adjustment 70 to be imaged by the camera 310 such that the detection light IDL is in a desired state.

In this embodiment, the first adjusting section 711, the calculating section 712, the determining section 713, and the second adjusting section 714 are separately configured. However, the first adjusting section 711 or the second adjusting section 714 may include the calculating section 712 or the determining section 713.

In this embodiment, the position detecting device 10 configures a part of the projector 100. However, the embodiment of the present disclosure is not limited to this. The position detecting device 10 may be configured as a device separate from the projector 100. Further, the position detecting device 10 may be set on an upper part of a flat panel display or the like other than the projector 100.

The functional sections shown in FIGS. 4 and 5 indicate functional components. Specific implementation forms of the functional sections are not particularly limited. That is, hardware individually corresponding to the functional sections does not always need to be implemented. It is naturally possible that one processor executes a program to realize functions of a plurality of functional sections. A part of the functions realized by software in the embodiment may be realized by hardware. Alternatively, a part of the functions realized by hardware in the embodiment may be realized by software. Besides, specific detailed configurations of the other sections of the projector 100 can be optionally changed in a range not departing from the gist of the present disclosure.

The processing units of the flowchart of FIG. 11 are divided according to the main processing contents in order to facilitate understanding of the processing of the control section 700. Without being limited by the way of the division and the names of the processing units shown in the flowchart of FIG. 11, according to processing contents, the processing units can be divided into a larger number of processing units or can be divided such that one processing unit includes a larger number of kinds of processing. The processing order of the flowchart is not limited to the illustrated example.

The control method for the position detecting device 10 can be realized by causing the processor 710 included in the position detecting device 10 to execute a control program corresponding to the control method for the position detecting device 10. The control program can also be recorded in a recording medium computer-readably recording the control program. As the recording medium, a magnetic or optical recording medium or a semiconductor memory device can be used. Specifically, examples of the recording medium include portable or stationary recording media such as a flexible disk, a HDD, a CD-ROM (Compact Disk Read Only Memory), a DVD, a Blu-ray (registered trademark) Disc, a magneto-optical disk, a flash memory, and a card-type recording medium. The recording medium may be a nonvolatile storage device such as a RAM, a ROM, or a HDD, which is an internal storage device included in an image processing apparatus. The control method for the position detecting device 10 can also be realized by causing a server apparatus or the like to store the control program corresponding to the control method for the position detecting device 10 and downloading the control program from the server apparatus to the position detecting device 10.

What is claimed is:

1. A control method for a position detecting device comprising:
   a first adjusting step of emitting detection light to a jig disposed on a display surface and adjust the detection light to first detection light such that the detection light is emitted to a specific range of the jig; and
   a step of setting, in a state in which the detection light has been adjusted to the first detection light, a region including the jig as a non-detection area where a detecting section does not detect the detection light as reflected light from an obstacle, wherein
   the position detecting device including a light emitting section configured to emit, along the display surface, the detection light for detecting a pointer that points the display surface and the detecting section configured to detect reflected light by the pointer of the detection light.

2. The control method for the position detecting device according to claim 1, further comprising:
   a calculating step of calculating a second reflection position of the reflected light sequentially reflected in a first reflection position of the jig and the second reflection position of the display surface and detected by the detecting section; and
   a determining step of determining whether the second reflection position is included in the non-detection area and, when determining that the second reflection position is not included in the non-detection area, adjusting the non-detection area such that the second reflection position is included in the non-detection area.

3. The control method for the position detecting device according to claim 1, further comprising a second adjusting step of, in a state in which the non-detection area has been set, when the detecting section detects the reflected light from the obstacle, adjusting the detection light adjusted to the first detection light to separate from the display surface in a normal direction of the display surface such that the detecting section does not detect the reflected light from the obstacle.

4. The control method for the position detecting device according to claim 1, wherein the first adjusting step includes a step of adjusting an angle formed by the detection light and the display surface.

5. The control method for the position detecting device according to claim 2, wherein, in the calculating step, the second reflection position is calculated as a mirror image position corresponding to the first reflection position of the detection light in the jig.

6. A position detecting device comprising:
   a light emitting section configured to emit, along a display surface, detection light for detecting a pointer that points the display surface;
   a detecting section configured to detect reflected light by the pointer of the detection light; and
   a processor configured to adjust the detection light to first detection light such that the detection light is emitted to a specific range of a jig disposed on the display surface, wherein
   the processor sets, in a state in which the detection light has been adjusted to the first detection light, a region including the jig as a non-detection area where the detecting section does not detect the detection light as reflected light from an obstacle.

7. A projector comprising:

a light emitting section configured to emit, along a display surface, detection light for detecting a pointer that points the display surface;

a detecting section configured to detect reflected light by the pointer of the detection light;

a processor configured to adjust the detection light to first detection light such that the detection light is emitted to a specific range of a jig disposed on the display surface; and a lens configured to project image light onto the display surface, wherein the processor sets, in a state in which the detection light has been adjusted to the first detection light, a region including the jig as a non-detection area where the detecting section does not detect the detection light as reflected light from an obstacle.

* * * * *